United States Patent
Gildert et al.

(10) Patent No.: US 12,240,121 B2
(45) Date of Patent: Mar. 4, 2025

(54) ROBOTS AND METHODS FOR UTILIZING IDLE PROCESSING RESOURCES

(71) Applicant: Sanctuary Cognitive Systems Corporation, Vancouver (CA)

(72) Inventors: Suzanne Gildert, Vancouver (CA); William G. Macready, West Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 293 days.

(21) Appl. No.: 18/089,155

(22) Filed: Dec. 27, 2022

(65) Prior Publication Data

US 2023/0202028 A1 Jun. 29, 2023

Related U.S. Application Data

(60) Provisional application No. 63/293,968, filed on Dec. 27, 2021.

(51) Int. Cl.
*B25J 9/00* (2006.01)
*B25J 9/16* (2006.01)

(52) U.S. Cl.
CPC ............ *B25J 9/1661* (2013.01); *B25J 9/1605* (2013.01); *G05B 2219/35204* (2013.01); *G05B 2219/39001* (2013.01)

(58) Field of Classification Search
CPC ...... B25J 9/1661; B25J 9/1605; B25J 9/1602; G05B 2219/35204; G05B 2219/39001; G05B 2219/40113
See application file for complete search history.

(56) References Cited

U.S. PATENT DOCUMENTS

2019/0109950 A1* 4/2019 Horcher ................. B65B 35/10
2020/0194297 A1* 6/2020 Jang .................. H01L 21/67745

* cited by examiner

*Primary Examiner* — Ian Jen
(74) *Attorney, Agent, or Firm* — Thomas Mahon (57) ABSTRACT

The present disclosure relates to utilizing idle processing resources of a robot to reduce future burden on such processing resources. In particular, idle processing resources are utilized to identify future scenarios, and generate reactions to such future scenarios. The generated reactions are stored, and quickly retrieved as needed if corresponding identified future scenarios occur.

14 Claims, 2 Drawing Sheets

ROBOTS AND METHODS FOR UTILIZING IDLE PROCESSING RESOURCES

TECHNICAL FIELD

The present robots and methods generally relate to efficiently using processing resources, and particularly relate to utilizing idle processing resources.

BACKGROUND

In the field of robotics, and computing in general, it is desirable for processing of information to be performed quickly and responsively. However, the amount of processing to be performed by a robot varies. Sometimes, processing demand may be very heavy, requiring a significant amount of a robot's processing resources. Other times, processing demand may be minimal, such that a significant amount of a robot's processing resources are underutilized or idle.

BRIEF SUMMARY

According to a broad aspect, the present disclosure describes a method of operation of a robot, the robot comprising a robot body, at least one processor carried by the robot body, and at least one non-transitory processor-readable storage medium carried by the robot body and communicatively coupled to the at least one processor, the method comprising: identifying, by the at least one processor, idle processing resources of the at least one processor; and utilizing the idle processing resources to proactively reduce future demand on processing resources, wherein utilizing the idle processing resources to proactively reduce future demand on processing resources includes: determining, by the at least one processor, a first context of the robot body based at least in part on first context data; identifying, by the at least one processor, a future scenario based at least in part on the first context; generating, by the at least one processor, a reaction to the future scenario; storing, by the at least one processor-readable storage medium, the reaction to the future scenario; and in response to a determination of occurrence of the future scenario, retrieving, by the at least one processor from the at least one non-transitory processor-readable storage medium, the reaction to the future scenario.

The method may further comprise determining, by the at least one processor, a second context of the robot body subsequent the first context based at least in part on second context data; the method may further comprise determining, by the at least one processor, occurrence of the future scenario based at least in part on the second context; and retrieving, by the at least one processor from the at least one non-transitory processor-readable storage medium, the reaction to the future scenario may be performed in response to determining occurrence of the future scenario based at least in part on the second context.

The method may further comprise executing, by the robot, the retrieved reaction to the future scenario.

Generating the reaction to the future scenario may comprise: generating processor-executable instructions to be executed by the at least one processor in response to the identified future scenario.

Identifying, by the at least one processor, at least one future scenario may comprises: identifying, by the at least one processor, a plurality of future scenarios; and generating the reaction to the future scenario may comprise: generating a plurality of reactions, each reaction of the plurality of reactions corresponding to a respective future scenario of the plurality of future scenarios.

Identifying, by the at least one processor, idle processing resources of the at least one processor may comprise: identifying, by the at least one processor, that a surplus of processing resources of the at least one processor are available.

The robot body may carry at least one sensor; the method may further comprise capturing, by the at least one sensor, first sensor data representing an environment of the robot body; and the first context data may include the first sensor data.

The first context data may include context data received from a device remote from the robot body.

The first context data may include previous context data indicative of a context of the robot body prior to the first context.

Identifying the future scenario may comprise: determining a possible scenario that may occur in the future based on historical data.

Generating the reaction to the future scenario may comprise: generating an action plan to be executed in response to the identified future scenario. The robot may further include at least one actuatable member; and the at least one action plan may include an action plan where the at least one actuatable member is actuated. The at least one action plan may include an action plan where the robot performs no action.

Generating the reaction to the future scenario may comprise: generating reaction data to be shared in response to the identified future scenario.

According to another broad aspect, the present disclosure describes a robot comprising a robot body, at least one processor carried by the robot body, and at least one non-transitory processor-readable storage medium carried by the robot body and communicatively coupled to the at least one processor, the at least one non-transitory processor-readable storage medium storing processor-executable instructions which when executed by the at least one processor cause the robot to: identify, by the at least one processor, idle processing resources of the at least one processor; and utilize the idle processing resources to proactively reduce future demand on processing resources, wherein the instructions which cause the robot to utilize the idle processing resources to proactively reduce future demand on processing resources cause the robot to: determine, by the at least one processor, a first context of the robot body based at least in part on first context data; identify, by the at least one processor, a future scenario based at least in part on the first context; generate, by the at least one processor, a reaction to the future scenario; store, by the at least one processor-readable storage medium, the reaction to the future scenario; and in response to a determination of occurrence of the future scenario, retrieve, by the at least one processor from the at least one non-transitory processor-readable storage medium, the reaction to the future scenario.

The processor-executable instructions may further cause the robot to determine, by the at least one processor, a second context of the robot body subsequent the first context based at least in part on second context data; the processor-executable instructions may further cause the robot to determine, by the at least one processor, occurrence of the future scenario based at least in part on the second context; and the processor-executable instructions which cause the robot to retrieve, by the at least one processor from the at least one non-transitory processor-readable storage medium, the reaction to the future scenario may be executed in response to determining occurrence of the future scenario based at least in part on the second context.

The processor-executable instructions may further cause the robot to perform the retrieved reaction to the future scenario.

The processor-executable instructions which cause the robot to generate the reaction to the future scenario may cause the at least one processor to: generate further processor-executable instructions to be executed by the at least one processor in response to the identified future scenario.

The processor-executable instructions which cause the robot to identify, by the at least one processor, at least one future scenario may cause the robot to: identify, by the at least one processor, a plurality of future scenarios; and the processor-executable instructions which cause the robot to generate, by the at least one processor, the reaction to the future scenario may cause the robot to: generate, by the at least one processor, a plurality of reactions, each reaction of the plurality of reactions corresponding to a respective future scenario of the plurality of future scenarios.

The processor-executable instructions which cause the robot to identify, by the at least one processor, idle processing resources of the at least one processor may cause the robot to: identify, by the at least one processor, that a surplus of processing resources of the at least one processor is available.

The robot body may carry at least one sensor; the processor-executable instructions may further cause the robot to capture, by the at least one sensor, first sensor data representing an environment of the robot body; and the first context data may includes the first sensor data.

The first context data may include context data received from a device remote from the robot body.

The first context data may include previous context data indicative of a context of the robot body prior to the first context.

The processor-executable instructions which cause the robot to identify, by the at least one processor, the future scenario may cause the robot to: determine, by the at least one processor, a possible scenario that may occur in the future based on historical data.

The processor-executable instructions which cause the robot to generate, by the at least one processor, the reaction to the future scenario may cause the robot to: generate, by the at least one processor, an action plan to be executed in response to the identified future scenario. The robot may further include at least one actuatable member; and the at least one action plan may include an action plan where the at least one actuatable member is actuated. The at least one action plan may include an action plan where the robot performs no action. The processor-executable instructions which cause the robot to generate, by the at least one processor, the reaction to the future scenario may cause the robot to: generate, by the at least one processor, reaction data to be shared in response to the identified future scenario.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

The following description sets forth specific details in order to illustrate and provide an understanding of the various implementations and embodiments of the present robots and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present robots and methods.

The various embodiments described herein provide robots and methods for utilizing idle processing resources to improve robot performance.

Figure 1:
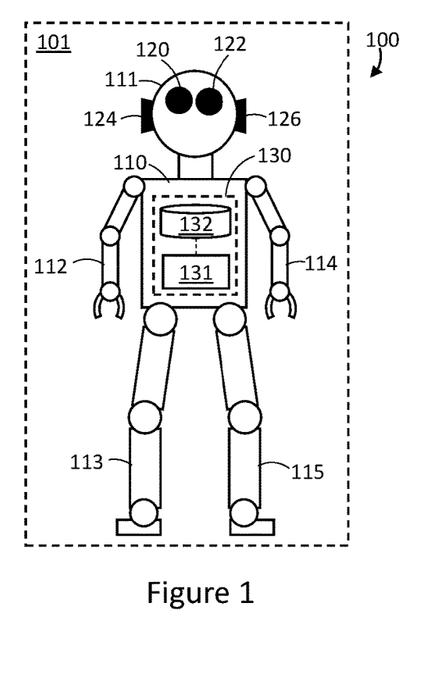
FIG. 1 is a front view of an exemplary robot body which approximates human anatomy.

FIG. 1 is a front view of an exemplary robot system 100 in accordance with one implementation. In the illustrated example, robot system 100 includes a robot body 101 that is designed to approximate human anatomy, including a torso 110 coupled to a plurality of components including head 111, right arm 112, right leg 113, left arm 114, and left leg 115 which approximate anatomical features. More or fewer anatomical features could be included as appropriate for a given application. Further, how closely a robot approximates human anatomy can also be selected as appropriate for a given application.

Each of components 110, 111, 112, 113, 114, 115 can be actuatable relative to other components. Actuators, motors, or other movement devices can couple together actuatable components. Driving said actuators, motors, or other movement driving mechanism causes actuation of the actuatable components. For example, rigid limbs in a humanoid robot can be coupled by motorized joints, where actuation of the rigid limbs is achieved by driving movement in the motorized joints.

Robot system 100 in FIG. 1 includes a robot body 101 that closely approximates human anatomy, such that input to or control of robot system 100 can be provided by an operator performing an action, to be replicated by the robot body 101 (e.g. via a tele-operation suit or equipment). In some implementations, it is possible to even more closely approximate human anatomy, such as by inclusion of actuatable components in a face on the head 111 of robot body 101, or with more detailed design of hands or feet of robot body 101, as non-limiting examples. However, in other implementations a complete approximation of the human anatomy is not required, and a robot body may only approximate a portion of human anatomy. As non-limiting examples, only an arm of human anatomy, only a head or face of human anatomy; or only a leg of human anatomy could be approximated.

Robot system 100 also includes sensors 120, 122, 124, and 126, which collect context data representing an environment of robot body 101. In the example, sensors 120 and 122 are image sensors (e.g. cameras) that capture visual data representing an environment of robot body 101. Although two image sensors 120 and 122 are illustrated, more or fewer image sensors could be included. Also in the example, sensors 124 and 126 are audio sensors (e.g. microphones) that capture audio data representing an environment of robot body 101. Although two audio sensors 124 and 126 are illustrated, more or fewer audio sensors could be included. Two types of sensors are illustrated in the example of FIG. 1, though more or fewer sensor types could be included. For example, only one of image sensors or audio sensors could be included. As another example, other sensor types, such as tactile sensors, accelerometers, inertial sensors, gyroscopes, temperature sensors, humidity sensors, pressure sensor, radiation sensors, or any other appropriate types of sensors could be included. Further, although sensors 120 and 122 are shown as approximating human eyes, and sensors 124 and 126 are shown as approximating human ears, sensors 120, 122, 124, and 126 could be positioned in any appropriate locations and have any appropriate shape.

Robot system 100 is also illustrated as including at least one processor 131, communicatively coupled to at least one non-transitory processor-readable storage medium 132. The at least one processor 131 can control actuation of components 110, 111, 112, 113, 114, and 115; can receive and process data from sensors 120, 122, 124, and 126; and can determine context of the robot body 101 as discussed later with reference to FIGS. 4 and 5. The at least one non-transitory processor-readable storage medium 132 can have processor-executable instructions stored thereon, which when executed by the at least one processor 131 can cause robot system 100 to perform any of the methods discussed herein (e.g. method 400 in FIG. 4 and method 500 in FIG. 5). Further, the at least one non-transitory processor-readable storage medium 132 can store sensor data, classifiers, or any other data as appropriate for a given application. Further still, the at least one non-transitory processor-readable storage medium 132 can store determined reactions to future scenarios, as discussed later with reference to FIG. 4. The at least one processor 131 and the at least one processor-readable storage medium 132 together can be considered as components of a "robot controller" 130, in that they control operation of robot system 100 in some capacity. While the at least one processor 131 and the at least one processor-readable storage medium 132 can perform all of the respective functions described in this paragraph, this is not necessarily the case, and the "robot controller" 130 can be or further include components that are remote from robot body 101. In particular, certain functions can be performed by at least one processor or at least one non-transitory processor-readable storage medium remote from robot body 101, as discussed later with reference to FIG. 3.

Figure 2:
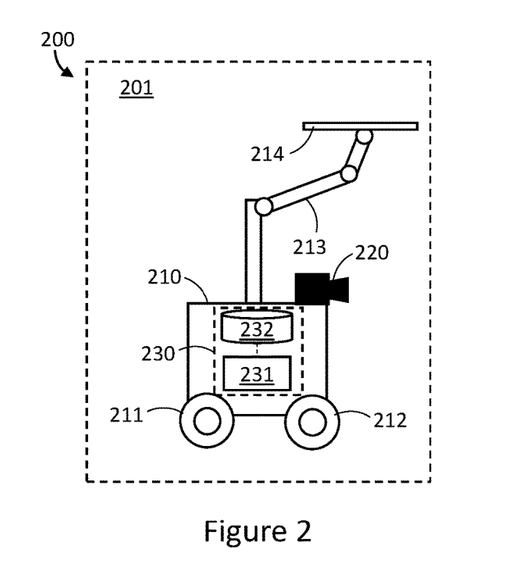
FIG. 2 is an elevated side view of a robot body which does not approximate human anatomy.

It is possible for a robot body to not approximate human anatomy. FIG. 2 is an elevated side view of a robot system 200 including a robot body 201 which does not approximate human anatomy. Robot body 201 includes a base 210, having actuatable components 211, 212, 213, and 214 coupled thereto. In the example, actuatable components 211 and 212 are wheels which provide movement capabilities to the robot body 201. Actuatable components 213 and 214 are a support arm and a tray, respectively. In other examples, other actuatable components could be included.

Robot system 200 also includes sensor 220, which is illustrated as an image sensor. The description pertaining to sensors 120, 122, 124, and 126 in FIG. 1 is also applicable to sensor 220 in FIG. 2 (and is applicable to inclusion of sensors in robot bodies in general).

Robot system 200 is also illustrated as including a local or on-board robot controller 230 comprising at least one processor 231 communicatively coupled to at least one non-transitory processor-readable storage medium 232. The at least one processor 231 can control actuation of components 210, 211, 212, 213, and 214; can receive and process data from sensor 220; and can determine context of the robot body 201 as discussed later with reference to FIGS. 4 and 5. The at least one non-transitory processor-readable storage medium 232 can store processor-executable instructions that, when executed by the at least one processor 231, can cause robot body 201 to perform any of the methods discussed herein (e.g. method 400 in FIG. 4 and method 500 in FIG. 5). Further, the at least one processor-readable storage medium 232 can store sensor data, classifiers, or any other data as appropriate for a given application. Further still, the at least one non-transitory processor-readable storage medium 232 can store determined reactions to future scenarios, as discussed later with reference to FIG. 4.

Figure 3:
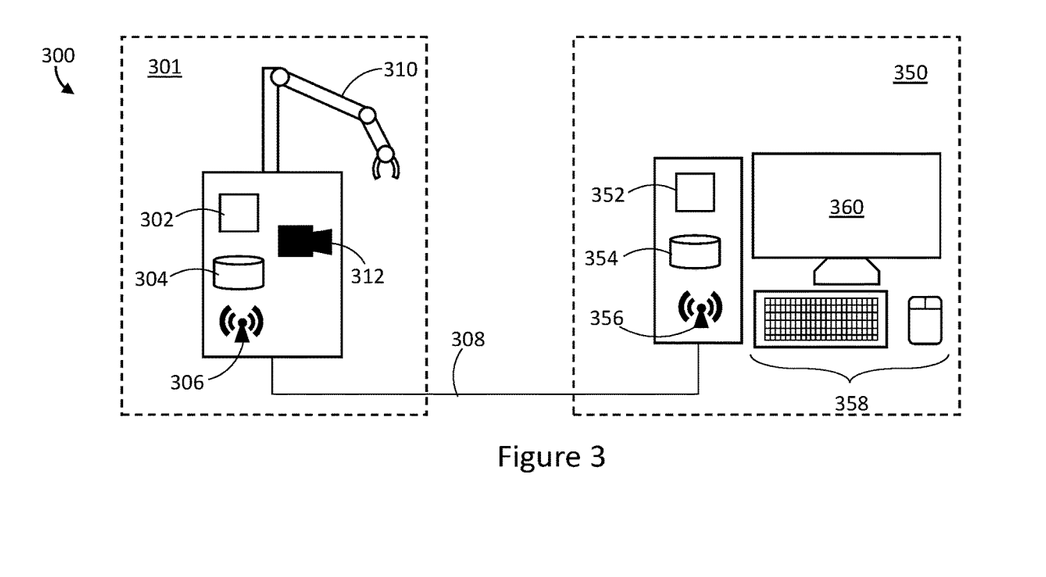
FIG. 3 is a schematic diagram illustrating a robot body and a remote device, which together can be considered as a "robot".

FIG. 3 is a schematic diagram illustrating components of a robot system 300 comprising a robot body 301 and a physically separate remote device 350 in accordance with the present robots and methods.

Robot body 301 is shown as including at least one local or on-board processor 302, a non-transitory processor-readable storage medium 304 communicatively coupled to the at least one processor 302, a wireless communication interface 306, a wired communication interface 308, at least one actuatable component 310, and at least one sensor 312. However, certain components could be omitted or substituted, or elements could be added, as appropriate for a given application. As an example, in many implementations only one communication interface is needed, so robot body 301 may include only one of wireless communication interface 306 or wired communication interface 308. Further, any appropriate structure of at least one actuatable portion could be implemented as the actuatable component 310 (such as those shown in FIGS. 1 and 2, for example). Further still, the at least one sensor 312 can include any appropriate quantity or type of sensor, as discussed with reference to FIGS. 1 and 2.

Remote device 350 is shown as including at least one processor 352, at least one non-transitory processor-readable medium 354, a wireless communication interface 356, a wired communication interface 308, at least one input device 358, and an output device 360. However, certain components could be omitted or substituted, or elements could be added, as appropriate for a given application. As an example, in many implementations only one communication interface is needed, so remote device 350 may include only one of wireless communication interface 356 or wired communication interface 308. As another example, input device 358 can receive input from an operator of remote device 350, and output device 360 can provide information to the operator, but these components are not essential in all implementations. For example, remote device 350 can be a server which communicates with robot body 301, but does not require operator interaction to function. Additionally, output device 360 is illustrated as a display, but other output devices are possible, such as speakers, as a non-limiting example. Similarly, the at least one input device 358 is illustrated as a keyboard and mouse, but other input devices are possible.

In some implementations, the at least one processor 302 and the at least one processor-readable storage medium 304 together can be considered as a "robot controller", which controls operation of robot body 301. In other implementations, the at least one processor 352 and the at least one processor-readable storage medium 354 together can be considered as a "robot controller" which controls operation of robot body 301 remotely. In yet other implementations, that at least one processor 302, the at least one processor 352, the at least one non-transitory processor-readable storage medium 304, and the at least one processor-readable storage medium 354 together can be considered as a "robot controller" (distributed across multiple devices) which controls operation of robot body 301. "Controls operation of robot body 301" refers to the robot controller's ability to provide instructions for operation of the robot body 301 to the robot body 301. In some implementations, such instructions could be explicit instructions which control specific actions of the robot body 301. In other implementations, such instructions could include broader instructions which instruct the robot body 301 generally, where specific actions of the robot body 301 are controlled by a control unit of the robot body 301 (e.g. the at least one processor 302), which converts the broad instructions to specific action instructions. In some implementations, a single remote device 350 may communicatively link to and at least partially control multiple (i.e., more than one) robot bodies. That is, a single remote device 350 may serve as (at least a portion of) the respective robot controller for multiple physically separate robot bodies 301.

Figure 4:
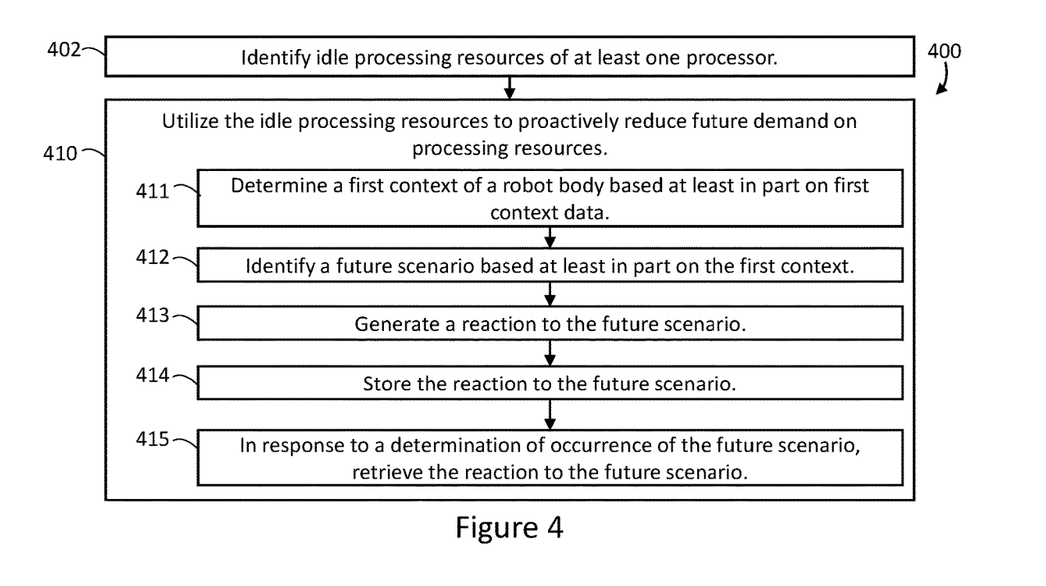
FIG. 4 is a flowchart diagram showing an exemplary method of operation of a robot.

FIG. 4 is a flowchart diagram showing an exemplary method 400 of operation of a robot in accordance with the present robots and methods. Method 400 as illustrated includes acts 402, 410, 411, 412, 413, 414, and 415, though those of skill in the art will appreciate that in alternative implementations certain acts may be omitted and/or additional acts may be added. Those of skill in the art will also appreciate that the illustrated order of the acts is shown for exemplary purposes only and may change in alternative implementations. A robot which can be operated in accordance with method 400 comprises a robot body (such as any of robot bodies 101, 201, or 301 discussed with reference to FIGS. 1, 2, and 3) at least one processor carried by the robot body (such as any of processors 131, 231, or 302 discussed with reference to FIGS. 1, 2, and 3), and at least one non-transitory processor-readable storage medium carried by the body and communicatively coupled to the at least one processor (such as any of non-transitory processor-readable storage mediums 132, 232, and 304 discussed with reference to FIGS. 1, 2, and 3). The at least one processor-readable storage medium can store processor-executable instructions that, when executed by at the at least one processor, cause the robot to perform the method 400.

At 402, idle processing resources of the at least one processor are identified (e.g. by the at least one processor). "Idle processing resources" generally refers to at least one processor having at least some computation cycles available. To this end, act 402 can comprise identifying, by the at least one processor, idle or unused computation cycles of the at least one processor. In one exemplary situation, the robot may be at least partially inactive while waiting for instructions or specific context before performing an action. While waiting, a robot may perform less processing than when active. For example, at least one processor of the robot may only process incoming communications, to determine whether instructions have been received. As another example, at least one processor of the robot may process incoming sensor data, to determine a context of the robot, but may not perform processing to control actuatable members of the robot. As a result, less processing resources are utilized than are available. A difference between utilized processing resources and unutilized processing resources represents idle processing resources. Idle processing resources could also be referred to as "surplus processing resources", in that the available processing resources exceed (are in surplus of) what is demanded of a task or tasks being performed. Depending on a task or tasks being performed, surplus processing resources may be plentiful, or may not be available. That is, required processing resources is dynamic, and as such so is a level of "idle" or "surplus" processing resources.

"Idle" processing resources could refer to some computation cycles of at least one processor being available (i.e. the at least one processor is being used, but not to the full extent possible). "Idle" processing resources could also refer to at least one processor of a plurality of processors being idle or unused (for example, at least one core of a multi-core processor is idle, or at least one computing unit of a plurality of connected computing units is idle).

At 410, the idle processing resources are proactively utilized to reduce future demand on processing resources. Act 410 as illustrated in FIG. 4 includes acts 411, 412, 413, 414, and 415, though in some implementations acts could be reordered, acts could be removed, or acts could be added as appropriate.

At 411, the at least one processor determines a first context of the robot body based at least in part on first context data. In some implementations, the first context data includes first sensor data from at least one sensor carried by the robot body. For example, any of the sensors discussed herein (including sensors 120, 122, 124, or 126 carried by robot body 101; sensor 220 carried by robot body 201; or sensor 312 carried by robot body 301) can capture first sensor data representing an environment of the robot body. For example, the first sensor data could be captured by any of image sensors, audio sensors, tactile sensors, accelerometers, inertial sensors, gyroscopes, temperature sensors, humidity sensors, pressure sensors, radiation sensors, and/or any other appropriate type of sensors. In some implementations, the first context data includes context data received from a device remote from the robot body (such as remote device 350 in FIG. 3). For example, the device remote from the robot body could provide information indicative of a context of the robot, such as operator input, task information, location information, instructions, or any other appropriate information or data which informs determination of the first context of the robot body. Further, while the first context data could be relatively instantaneous (i.e. only pertinent to a moment of time), it is also possible for the first context data to represent a longer period of time. For example, the first context data can include previous context data indicative of a context of the robot body prior to the first context. Such previous context data may provide additional information regarding a context of the robot body which may not be provided by instantaneous context data alone. As one example, the previous context data could include information regarding transit of the robot body to a present location of the robot body. While the location of the robot body itself may not be entirely informative, transit of the robot body to said location may provide a detailed understanding of the nature of the location of the robot body. As another example, previous context data may be indicative of what a robot body is carrying (e.g. a payload or tools), where instantaneous context data may not be (e.g. if sensors of the robot body cannot see, feel, or identify what is being carried).

At 411, the at least one processor analyzes the first context data, and determines a first context of the robot body based at least in part thereon. Several examples of determining context are discussed later (see the first, second, third, and fourth situations discussed later). Generally, determining the first context of the robot body can involve analyzing sensor data to identify features in an environment of the robot body (e.g. with classifiers based on image data). This can be combined with external data which provides additional information regarding the first context of the robot body.

At 412, the at least one processor identifies a future scenario based at least in part on the first context determined at 411. In particular, the at least one processor proactively anticipates events that may happen, instructions that may be received, situations that may need to be addressed, questions that may be asked, or any other appropriate scenario that may happen in the future. Identification of such a future scenario is based at least in part on the first context, because location, environments, or surroundings of the robot body are likely to influence future scenarios the robot body may encounter. Several exemplary future scenarios are discussed later (see the first, second, third, and fourth situations discussed later). Identification of future scenarios may be based on more information than the first context determined at 411. Other examples of information that could be utilized could be historical data, weather data, impending task data, or any other appropriate data. Several examples are discussed later.

At 413, the at least one processor generates a reaction to the future scenario identified in act 412. Generating the reaction to the future scenario can comprise generating processor-executable instructions to be executed by the at least one processor in response to the identified future scenario. As an example, the at least one processor can generate at least one action plan to be executed in response to the identified future scenario. For a robot including at least one actuatable member (such as robots 100, 200, and 300 illustrated in FIGS. 1, 2, and 3), the at least one action plan can include an action plan where the at least one actuatable member is actuated. In some cases, the at least one action plan can include an action plan where the robot performs no action (e.g. the robot waits). In some cases, generating the reaction to the future scenario comprises generating reaction data to be shared in response to the identified future scenario. Several examples of generating a reaction to the future scenario are discussed later (see the first, second, third, and fourth situations discussed later).

At 414, the at least one non-transitory processor-readable storage medium stores the reaction to the future scenario. For example, a generated action plan or processor-executable instructions comprising the reaction can be stored at the at least non-transitory processor-readable storage medium. The reaction can be stored for quick and/or easy access. For example, the reaction can be stored in a look-up table. Optionally, the reaction could be stored in fast-access memory, such as RAM.

At 415, in response to a determination of occurrence of the future scenario, the at least one processor retrieves the reaction to the future scenario. The robot can then execute the retrieved reaction to the future scenario. A detailed method for determining occurrence of the future scenario is discussed below with reference to FIG. 5.

In some implementations, identifying the at least one future scenario as in act 412 can comprise identifying, by the at least one processor, a plurality of future scenarios. In such implementations, generating the reaction to the future scenario as in act 413 can comprise generating a plurality of reactions, each reaction of the plurality of reactions corresponding to a respective future scenario of the plurality of future scenarios. The plurality of reactions may all be stored in a single look-up table indexed by future scenario and each accessed if and when a corresponding future scenario is realized. In such implementations, a determination of occurrence of the future scenario as in act 415 can comprise a determination of one future scenario of the plurality of future scenarios, and retrieving a reaction to the future scenario as in act 415 can comprise retrieving a reaction of the plurality of reactions which corresponds to the determined one future scenario of the plurality of future scenarios.

Figure 5:
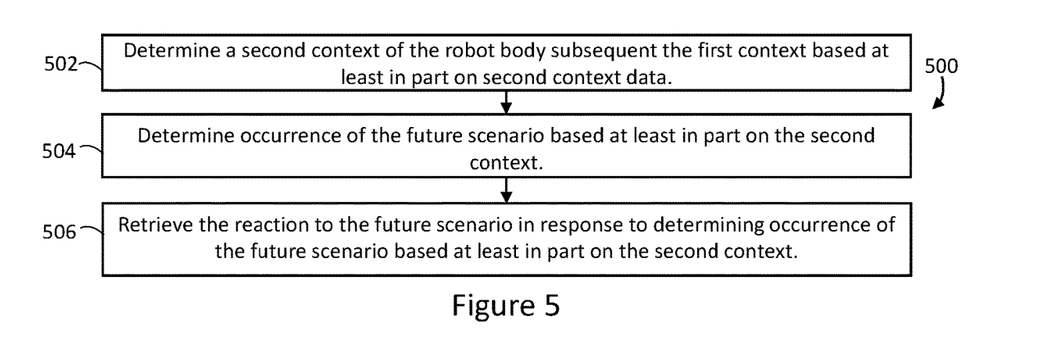
FIG. 5 is a flowchart diagram showing an exemplary method of determining occurrence of a future scenario.

FIG. 5 is a flowchart diagram showing an exemplary method 500 of determining occurrence of a future scenario in accordance with the present robots and methods. Method 500 as illustrated includes acts 502, 504, and 506, though those of skill in the art will appreciate that in alternative implementations certain acts may be omitted and/or additional acts may be added. Those of skill in the art will also appreciate that the illustrated order of the acts is shown for exemplary purposes only and may change in alternative implementations. The acts of method 500 are an illustrative example of how determination of occurrence of a future scenario, as in act 415 of method 400, can be achieved. A robot which can be operated in accordance with method 500 comprises a robot body (such as any of robot bodies 101, 201, or 301 discussed with reference to FIGS. 1, 2, and 3) at least one processor carried by the robot body (such as any of processors 131, 231, or 302 discussed with reference to FIGS. 1, 2, and 3), and at least one non-transitory processor-readable storage medium carried by the body and communicatively coupled to the at least one processor (such as any of non-transitory processor-readable storage mediums 132, 232, and 304 discussed with reference to FIGS. 1, 2, and 3). The at least one processor-readable storage medium can store processor-executable instructions that, when executed by at the at least one processor, cause the robot to perform the method 500.

In 502, a second context of the robot body subsequent to the first context is determined by the at least one processor, based at least in part on second context data. Determination of the second context can be performed in a similar manner to determination of the first context as discussed earlier with reference to act 411 in method 400. However, the second context data can differ from the first context data, in that more current information is available in the second context data. For example, at least one sensor of the robot may have captured sensor data that is indicative of a change in the environment (or context) of the robot body. As another example, the robot may have received instructions, such as from an operator or server.

In act 504, the at least one processor determines occurrence of the future scenario based at least in part on the second context. In particular, if the second context is indicative of a predicated future scenario having been realized, the at least one processor determines that the future scenario has occurred. For example, the second context may indicate that instructions were received, as predicted in an identified future scenario. As another example, the second context may indicate that an environment has changed (or the robot body has changed environment), as predicted in an identified future scenario.

In act 506, the determined reaction to the future scenario (generated in act 413 and stored in act 414) is retrieved from the at least one non-transitory processor-readable storage medium. The retrieved reaction can then be executed or performed.

In some cases, a future scenario as identified in act 412 may not come to pass, and thus a corresponding reaction generated in act 413 may not be used or executed. In other cases, a future scenario may have come to pass, but is no longer expected to come to pass again. For cases where a future scenario does not come to pass or is no longer expected to come to pass (e.g. after a certain time has elapsed, after certain conditions are met, or context of the robot changes to the degree that occurrence of the future scenario is unlikely), reactions generated for the identified future scenario can be deleted from the at least one non-transitory processor readable storage medium of the robot body.

Several situations are discussed below, which detail specific examples of how the present robots and methods can be implemented in practice. One skilled in the art will appreciate that these situations are merely exemplary, and the present robots and methods can be implemented or modified in any manner as appropriate for a given situation or implementation.

A first example situation involves a concierge robot at a hotel, which provides concierge services to guests of the hotel (e.g., answering questions, performing check-ins, performing check-outs, etcetera). In this first situation, the concierge robot uses idle processing resources to proactively determine and store answers to common questions asked during specific hours. The vast quantity of questions and scenarios the concierge robot can be faced with may necessitate a library of reactions (responses) which is very large. Consequently, the library of reactions in its entirety is not stored in a form where every reaction can be accessed in the fastest manner possible. As one example, a full library of reactions may not be stored anywhere, and instead the robot generates reactions based on algorithms or AI. As another example, a full library of reactions may be stored on a device remote from the concierge robot (such as a server), and only a limited number of reactions may be stored locally at the concierge robot. As yet another example, a full library of reactions may be stored locally at the concierge robot, but on a relatively slow to access storage medium. To address this, the concierge robot utilizes the methods or instructions described herein to provide fast reactions (responses) to common topics.

In this first situation, the concierge robot identifies that idle processing resources are available as in act 402 of method 400 (e.g. at least one processor of the concierge robot is at least partially idle, for example when the concierge robot is not interacting with a hotel guest). Alternatively, it could be said that the concierge robot identifies that a surplus of processing resources are available. The concierge robot then utilizes these idle processing resources to proactively reduce future demand on processing resources as in act 410 of method 400.

As in act 411 of method 400, the concierge robot determines a first context of a body of the concierge robot (e.g. that it is in the hotel lobby) based at least in part on first context data (e.g. location data from a location sensor of the concierge robot; image data from an image sensor of the concierge robot; instruction data where the concierge robot was instructed to operate in the lobby; or any other appropriate context data).

As in act 412 of method 400, the concierge robot identifies a future scenario based at least in part on the first context. For example, based on the first context of the concierge robot being located in the hotel lobby, the concierge robot may identify based on historical data that 75% of interactions with hotel guests in the lobby between the hours of 5 PM and 8 PM involve guests asking where the hotel restaurant is.

As in act 413 of method 400, a reaction is generated for the identified future scenario. In the illustrated example, the concierge robot prepares directions to the hotel restaurant. The directions could be prepared in any appropriate format, or multiple formats. For example, the concierge robot could prepare verbal directions, textual directions, visual directions (e.g. a map or sequential images), and/or directions by gesturing (e.g. moving an actuatable member such as an arm or hand of the concierge robot).

As in act 414 of method 400, the generated reaction is stored. The reaction can be stored locally on a non-transitory processor-readable storage medium of the concierge robot, and is preferably (but optionally) stored on a fast access medium such as RAM.

As in act 415, in response to determination of occurrence of the future scenario (when a guest asks the concierge robot where the restaurant is), the directions to the hotel restaurant are retrieved, and presented to the guest. The concierge robot includes any appropriate hardware to present the directions, such as a display, at least one speaker, and/or at least one actuatable member, as non-limiting examples.

Determination of occurrence of the future scenario (when a guest asks the concierge robot where the restaurant is) can be performed for example as discussed with reference to FIG. 5. In particular, the request from the guest could be received by any appropriate means, such as an audio sensor which captures audio data of the guest's voice asking where the restaurant is, or a touch-input device where the quest enters a query with their fingers, as non-limiting examples. These inputs from the guest are included in the second context data in act 502 of method 500.

Although directions to the hotel restaurant were prepared based on historical data for the time frame of 5 PM to 8 PM, the robot does not need to wait until this time frame to retrieve the stored directions. For example, if the robot determines that a quests asks where the restaurant is at 4:45 PM, the robot may still retrieve and present the stored directions.

After 8 PM, the stored directions could be deleted from the non-transitory processor-readable storage medium of the concierge robot, as these directions are no longer expected to be commonly requested for an extended time period. Alternatively, the stored directions could remain on the non-transitory processor-readable storage medium of the robot until storage space is needed for something else (e.g. a generated reaction to a different future scenario), at which point stored reactions (including the stored directions) can be deleted based on priority.

A second example situation involves a labor robot, which performs physical labor tasks (in this example, cleaning tasks, though other tasks are possible). In this second situation, the labor robot proactively determines and stores information helpful to cleaning tasks prior to performing cleaning tasks, to provide fast services when they are needed.

In this second situation, the labor robot identifies that a surplus of processing resources is available as in act 402 of method 400 (e.g. at least one processor of the labor robot is at least partially idle, for example when the labor robot is awaiting instructions or other input, such as certain context). Alternatively, it could be said that the labor robot identifies idle processing resources as in act 402 of method 400. The labor robot then utilizes these surplus processing resources to proactively reduce future demand on processing resources as in act 410 of method 400.

As in act 411 of method 400, the labor robot determines a first context of a body of the labor robot based at least in part on first context data (e.g. location data from a location sensor of the labor robot; image data from an image sensor of the labor robot; instruction data where the labor robot was instructed to operate in a certain location; or any other appropriate context data). For example, the labor robot can determine that it is in a bathroom. Further, the labor robot can determine that there is a person in the bathroom (e.g. based on image data from an image sensor showing a person in the bathroom; audio data from an audio sensor which includes sounds made by a person, thermal data from a thermal sensor which indicates a heat signature of a person, or any other appropriate sensor). A control algorithm or instructions for the labor robot may prevent the robot from cleaning the bathroom when a person is present, and may cause the robot to move out of the way of the person. For privacy reasons, the control algorithm or instructions for the labor robot may cause the robot to disable at least one sensor of the robot if a person is detected in the bathroom (e.g., an image sensor may be disabled). This is an example where acts of method 400 can be reordered or combined: in this situation, the first context may cause the robot to not clean the bathroom and to instead wait, and based on this the labor robot may identify a surplus of processing resources (or idle processing resources) as in act 402.

As in act 412 of method 400, the labor robot identifies a future scenario based at least in part on the first context. For example, based on the first context of the labor robot being located in the bathroom and a person being present in the bathroom, the labor robot may identify a future scenario where the person leaves the bathroom or no people are present in the bathroom.

As in act 413 of method 400, a reaction is generated for the identified future scenario. In the illustrated example, the labor robot can identify features of the bathroom to be cleaned, such as mirrors, fixtures, counters, handles, toilets, floors, or any other appropriate features. The labor robot can further determine which of the features need to be cleaned. The labor robot can further generate an action plan for cleaning the features, such as an order to clean, a movement path between features, how to actuate at least one actuatable member of the labor robot to clean each feature, or any other appropriate aspects of an action plan. While the described action plan includes certain described aspects, fewer or more aspects could be included in the action plan, as appropriate for a given application and/or as appropriate for a quantity or level of surplus or idle processing resources available.

As in act 414 of method 400, the generated reaction is stored. The reaction can be stored locally on a non-transitory processor-readable storage medium of the labor robot, and is preferably (but optionally) stored on a fast access medium such as RAM.

As in act 415, in response to determination of occurrence of the future scenario (when the person leaves the bathroom, or a determination that no people are present in the bathroom), the reaction is retrieved, and the labor robot begins cleaning the bathroom.

Determination of occurrence of the future scenario (when the person leaves the bathroom, or a determination that no people are present in the bathroom) can be performed for example as discussed with reference to FIG. 5. As one example, the labor robot could monitor a heat signature of the person, to determine when the person exits the bathroom (it is possible to monitor the person based on any appropriate sensor, but for privacy reasons it may be preferable to avoid monitoring the person with an image sensor). As another example, the labor robot could periodically check sensor data to determine whether any people are present in the bathroom. Sensor data indicative of presence of people in the bathroom is included in the second context data in act 502 of method 500.

A third example situation involves a driving robot, which drives a vehicle (e.g. a taxi) to locations specified by clients. The driver robot could take any appropriate form. In one example, the driver robot mechanically interfaces with a vehicle that would otherwise be operated by a human (e.g. the driver robot sits in the driver's seat, grabs the steering wheel, and operates the pedals). In another example, the driver robot is integrated in the vehicle, and controls the vehicle directly (e.g. does not occupy a seat). In this third situation, the driver robot proactively determines and stores routes to common destinations. The vast quantity of destinations available to the driver robot may necessitate a library of reactions (routes) which is very large. Consequently, the library of reactions in its entirety is not stored in a form where every reaction can be accessed in the fastest manner possible. As one example, a full library of routes may not be stored anywhere, and instead the driver robot generates routes based on algorithms or AI. As another example, a library of reactions may be stored on a device remote from the driver robot (such as a server), and only a limited number of reactions may be stored locally at the driver robot. As yet another example, a library of reactions may be stored locally at the driver robot, but on a relatively slow to access storage medium. To address this, the driver robot utilizes the methods or instructions described herein to provide fast reactions (routes) to common destinations.

In this third situation, the driver robot identifies idle processing resources as in act 402 of method 400 (e.g. at least one processor of the driver robot is at least partially idle, for example when the driver robot is not driving, such as when the driver robot is waiting for a client). Alternatively, it could be said that the driver robot identifies a surplus of processing resources. The driver robot then utilizes these idle processing resources to proactively reduce future demand on processing resources as in act 410 of method 400.

As in act 411 of method 400, the driver robot determines a first context of a body of the driver robot (e.g. a location of the driver robot, or whether the driver robot has a client onboard the vehicle) based at least in part on first context data (e.g. location data from a location sensor of the driver robot; image data from an image sensor of the driver robot; instruction data where the driver robot was instructed to operate in a specified location; or any other appropriate context data).

As in act 412 of method 400, the driver robot identifies a future scenario based at least in part on the first context. For example, based on the first context of the driver robot being at a specific location, at a specific time, the driver robot may identify based on historical data at least one common destination for clients picked up at the specific location, around the specific time.

As in act 413 of method 400, a reaction is generated for the identified future scenario. In the illustrated example, the driver robot determines at least one route to the at least one common destination. The determined routes can be optimized for present or future traffic, based on historical traffic data.

As in act 414 of method 400, the generated reaction is stored. The reaction (the at least one route) can be stored locally on a non-transitory processor-readable storage medium of the driver robot, and is preferably (but optionally) stored on a fast access medium such as RAM.

As in act 415, in response to determination of occurrence of the future scenario (when a client provides instructions to a destination of the at least one common destination), the route corresponding to the destination indicated in the instructions is retrieved. The driver robot proceeds to drive to the destination via the retrieved route. In some implementations, multiple routes to the destination may be generated in act 413, and subsequently retrieved, and the driver robot may check which of the retrieved routes is optimal based on present context data (such as real-time traffic data). Such an implementation can offset non-optimal route taking in cases where historical traffic data, on which a proactive determination of route is based, is inaccurate.

Determination of occurrence of the future scenario (when a client provides instructions to a destination of the at least one common destination) can be performed for example as discussed with reference to FIG. 5. In particular, the instructions from the client could be received by any appropriate means, such as an audio sensor which captures audio data of the client's voice providing destination instructions, or a touch-input device where the client enters a destination with their fingers, as non-limiting examples. These inputs from the client are included in the second context data in act 502 of method 500.

A fourth example situation involves a service robot which carries out tasks outdoors. In this fourth situation, the service robot proactively determines escape plans in the case of adverse weather.

In this fourth situation, the service robot identifies that a surplus of processing resources is available as in act 402 of method 400 (e.g. at least one processor of the service robot is at least partially idle, for example when the service robot is not performing a task, or performance of a task does not occupy all of the service robot processing resources). Alternatively, it could be said that the service robot identifies idle processing resources as in act 402 of method 400. The service robot then utilizes these surplus processing resources to proactively reduce future demand on processing resources as in act 410 of method 400.

As in act 411 of method 400, the service robot determines a first context of a body of the service robot (e.g. that it is outdoors) based at least in part on first context data (e.g. location data from a location sensor of the service robot; image data from an image sensor of the service robot; instruction data where the service robot was instructed to operate outdoors; or any other appropriate context data). Determining the first context may further include determining a weather of the environment in which the service robot is located.

As in act 412 of method 400, the service robot identifies a future scenario based at least in part on the first context. For example, based on the first context of the service robot being located outdoors, the service robot may identify that rain is possible. In some cases, rain could always be identified as a possibility when the service robot is outdoors. In other cases, the identification of rain as a possibility could be based on the first context in that the service robot may identify onset weather based on identifiable patterns in the environment (e.g. such as dark clouds in the sky visible to an image sensor of the robot, or pressure differentials measured by a pressure sensor of the service robot). The identification can also be based on additional information or data, such as weather forecast data which predicts possibility of rain, or historical data which indicates rain patterns for the location.

As in act 413 of method 400, a reaction is generated for the identified future scenario. In the illustrated example, the service robot prepares an escape or protection plan. An escape plan could include determining a route to a known safe location (such as an indoor location which the service robot has access to), or to a location which the service robot identifies as safe (such as an overhead cover in a field of view of an image sensor of the service robot), as non-limiting examples. A protection plan could include the service robot preparing precautions to protect itself from rain (such as by locating and retrieving an umbrella), as a non-limiting example. In some cases, the generated reaction may involve no action from the service robot. For example, the service robot could identify that is already positioned in a safe place (such as under an overhead cover), despite being outdoors. As such, the generated reaction could be for the service robot to stay still (or do nothing) in the event of rain.

As in act 414 of method 400, the generated reaction is stored. The reaction can be stored locally on a non-transitory processor-readable storage medium of the service robot, and is preferably (but optionally) stored on a fast access medium such as RAM.

As in act 415, in response to determination of occurrence of the future scenario (when rain begins to fall), the escape plan/protection plan is retrieved and actioned (or no action is taken, in the case where the generated reaction is to do nothing).

Determination of occurrence of the future scenario (when rain begins to fall) can be performed for example as discussed with reference to FIG. 5. In particular, an audio sensor of the service robot may capture the sound of rainfall, an image sensor of the service robot may capture at least one image of rain, or a humidity sensor of the service robot may measure an increase in humidity, as non-limiting examples. Such sensor data is included in the second context data in act 502 of method 500.

Each of the above exemplary first situation, second situation, third situation, and fourth situation include discussion of identification of one future scenario, generation of one reaction, and storing and retrieving of the one reaction. However, in any of these examples, a plurality of future scenarios could be identified, a reaction corresponding to each identified future scenario can be generated and stored, and an appropriate reaction can be retrieved based on occurrence of a corresponding future scenario. As an example, for a plurality of identified future scenarios, a plurality of reactions could be generated and stored in a look-up table. The look-up table can be indexed by future scenario, such that when a future scenario occurs, a corresponding reaction can be quickly accessed based on the look-up table.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of operation of a robot, the robot comprising a robot body, at least one processor carried by the robot body, and at least one non-transitory processor-readable storage medium carried by the robot body and communicatively coupled to the at least one processor, the method comprising:
   identifying, by the at least one processor, idle processing resources of the at least one processor; and
   utilizing the idle processing resources to proactively reduce future demand on processing resources, wherein utilizing the idle processing resources to proactively reduce future demand on processing resources includes:
      determining, by the at least one processor, a first context of the robot body based at least in part on first context data;
      identifying, by the at least one processor, a future scenario based at least in part on the first context;
      generating, by the at least one processor, a reaction to the future scenario;
      storing, by the at least one processor-readable storage medium, the reaction to the future scenario; and
      in response to a determination of occurrence of the future scenario, retrieving, by the at least one processor from the at least one non-transitory processor-readable storage medium, the reaction to the future scenario.

2. The method of claim 1, wherein:
   the method further comprises determining, by the at least one processor, a second context of the robot body subsequent the first context based at least in part on second context data;
   the method further comprises determining, by the at least one processor, occurrence of the future scenario based at least in part on the second context; and retrieving, by the at least one processor from the at least one non-transitory processor-readable storage medium, the reaction to the future scenario is performed in response to determining occurrence of the future scenario based at least in part on the second context.

3. The method of claim 1, further comprising executing, by the robot, the retrieved reaction to the future scenario.

4. The method of claim 1, wherein generating the reaction to the future scenario comprises:
generating processor-executable instructions to be executed by the at least one processor in response to the identified future scenario.

5. The method of claim 1, wherein:
identifying, by the at least one processor, at least one future scenario comprises: identifying, by the at least one processor, a plurality of future scenarios; and
generating the reaction to the future scenario comprises: generating a plurality of reactions, each reaction of the plurality of reactions corresponding to a respective future scenario of the plurality of future scenarios.

6. The method of claim 1, wherein identifying, by the at least one processor, idle processing resources of the at least one processor comprises:
identifying, by the at least one processor, that a surplus of processing resources of the at least one processor is available.

7. The method of claim 1, wherein:
the robot body carries at least one sensor;
the method further comprises capturing, by the at least one sensor, first sensor data representing an environment of the robot body; and
the first context data includes the first sensor data.

8. The method of claim 1, wherein the first context data includes context data received from a device remote from the robot body.

9. The method of claim 1, wherein the first context data includes previous context data indicative of a context of the robot body prior to the first context.

10. The method of claim 1, wherein identifying the future scenario comprises:
determining a possible scenario that may occur in the future based on historical data.

11. The method of claim 1, wherein generating the reaction to the future scenario comprises:
generating an action plan to be executed in response to the identified future scenario.

12. The method of claim 11, wherein:
the robot further includes at least one actuatable member; and
the at least one action plan includes an action plan where the at least one actuatable member is actuated.

13. The method of claim 11, wherein the at least one action plan includes an action plan where the robot performs no action.

14. The method of claim 1, wherein generating the reaction to the future scenario comprises:
generating reaction data to be shared in response to the identified future scenario.

* * * * *